Patented Jan. 5, 1943

2,307,700

UNITED STATES PATENT OFFICE 2,307,700

α-PHENYL CINNAMIC NITRILE AS AN INSECTICIDE

William Moore, Stamford, Conn., assignor to American Cyanamid Company, New York, N. Y., a corporation of Maine No Drawing. Application March 7, 1941,
Serial No. 382,170

1 Claim. (Cl. 167—30)

The present invention relates to a pest-control agent and more particularly to a compound which is especially effective as a contact poison for the control of insects and allied pests.

I have discovered that α-phenyl cinnamic nitrile possesses strong insecticidal activity against sucking and soft-bodies insects which are particularly difficult to exterminate, for example the citrus red spider, *Tetranychus citri*, and the bean aphid, *Aphis rumicis*.

The following example illustrates a specific method of preparing the above compound in accordance with the invention. Materials employed are in parts by weight.

Example

To a mixture consisting of 10 parts of phenyl acetonitrile and 9.1 parts of benzaldehyde, there was added one part of a 10% solution of sodium hydroxide in ethyl alcohol. After standing one hour at room temperature, water had separated from the reaction mixture and crystallization began. The reaction was complete in approximately two hours. After recrystallization from alcohol, the α-phenyl cinnamic nitrile was obtained as a colorless crystalline material which melted at 85° C.

Spray solutions were prepared by dissolving the α-phenyl cinnamic nitrile in a solvent medium consisting of 65% acetone and 35% water. A 100% control was obtained when a spray of 1–500 dilution was used against the citrus red spider, *Tetranychus citri*. At the same dilution the insecticide gave a 90% control on the bean aphid, *Aphis rumicis*.

Although the compound of this invention is especially effective as a contact poison for the control of insect pests, it may also be used for fungicidal and bactericidal purposes.

This new insecticide may be applied in any of the conventional manners. Thus, for example, it may be used in an aqueous emulsion or incorporated in organic liquids such as the aliphatic and aromatic hydrocarbons for spraying purposes, or it may be effectively used in dusts with such inert solid diluents as kieselguhr, wood flour, walnut shell, talc, and the like.

While the invention has been described with particular reference to specific embodiments, it is to be understod that it is not to be limited thereto but is to be construed broadly and restricted solely by the scope of the appended claim.

I claim:
An insecticide containing as an active ingredient α-phenyl-cinnamic nitrile.

WILLIAM MOORE.